June 24, 1969  R. E. SMITH  3,451,788
METHOD OF SLIMES ELIMINATION IN POTASH ORE TREATMENT
Filed Jan. 18, 1965
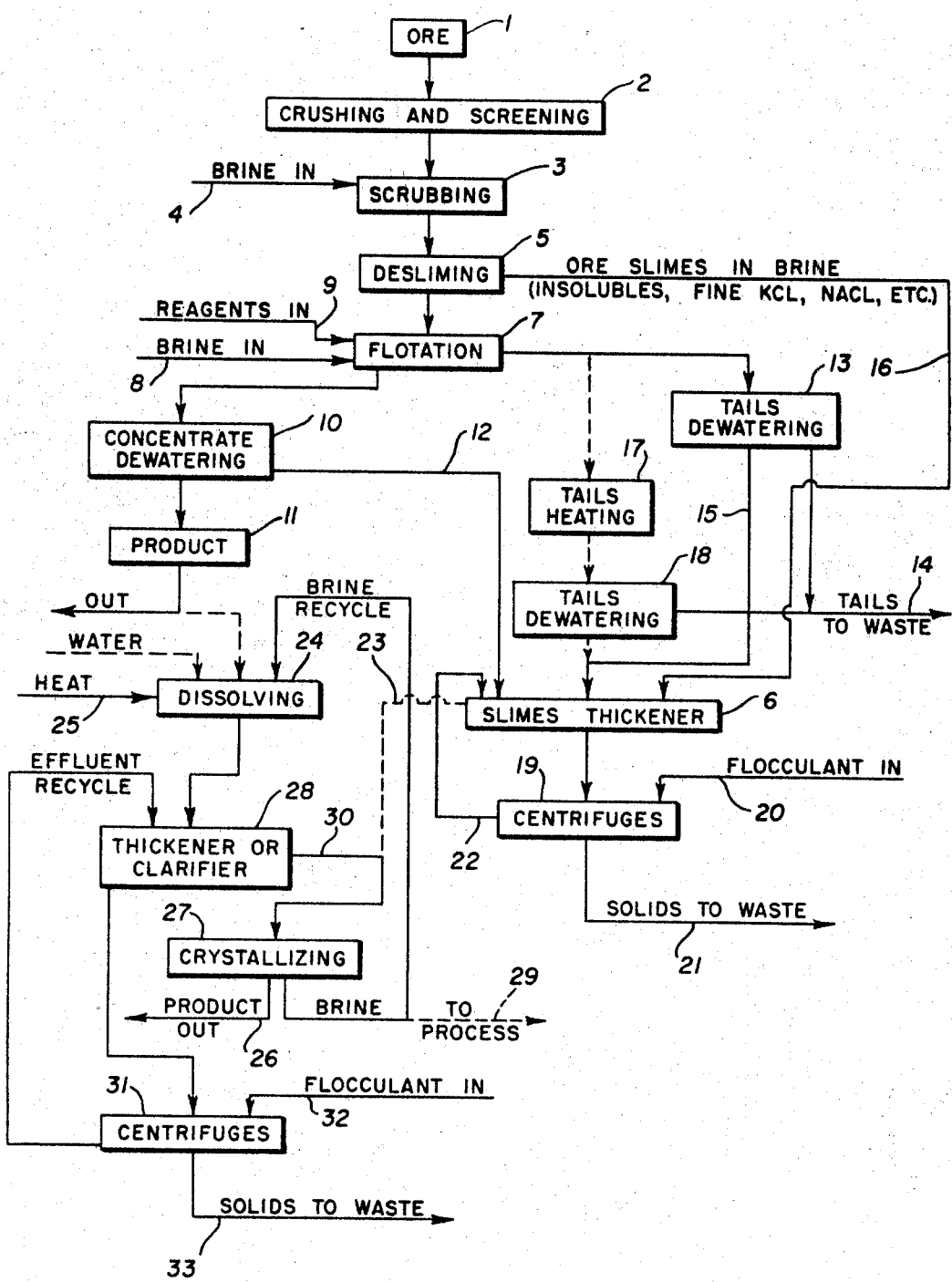
INVENTOR.
Randal E. Smith
BY
ATTORNEYS United States Patent Office 3,451,788
Patented June 24, 1969

3,451,788
METHOD OF SLIMES ELIMINATION IN POTASH ORE TREATMENT
Randal E. Smith, Carlsbad, N. Mex., assignor, by mesne assignments, to Ideal Basic Industries, Inc., Denver, Colo., a corporation of Colorado
Filed Jan. 18, 1965, Ser. No. 426,258
Int. Cl. B01d 9/02; B03d 3/06; C01d 3/14
U.S. Cl. 23—299                              7 Claims

ABSTRACT OF THE DISCLOSURE

Sylvinite ore processing for sylvite recovery, including a desliming stage, thickening of the slimes material, passing the underflow of the thickening stage to a continuous centrifuging stage with flocculant introduction into the slimes material under treatment therein, thereby inducing high settling rates for contained clay producing clean separation from associated brine, and returning the centrate to another treatment stage.

---

This invention relates to the treatment of potash ores and more particularly to a treatment of the ore slimes, resulting from ore preparation and a flotation separation of sylvinite ore. These slimes consist of finely divided clays, KCl and NaCl crystals, and other minerals, suspended in brine. This invention also relates to the treatment of slimes created by dissolving of ores or of sylvite concentrated by flotation.

Procedures for separating the sylvite content from halite and insolubles of sylvinite ores are well known. In the usual milling operation, the ore after being reduced to a suitable flotation size is deslimed, conditioned and then conducted through one or more flotation cells in which the sylvite concentrate is separated. The usual treatment following the flotation separation is to conduct the tailings material to a thickener and/or filter, centrifuge, or other dewatering mechanism where the solids comprising the tailings are separated from the brine which is the carrier vehicle.

In most operations, the ore prior to flotation is subjected to a desliming operation in which most of the free or liberated insoluble content is removed. However, some of the insoluble passes into the flotation stage and is collected with the tailings and concentrates. In addition, the grinding operation or other size reduction to flotation size produces a fraction of extremely fine sizes, some of which will be the desired sylvite material mixed with corresponding sizes of halite.

In a circuit where the slimes are delivered to a thickening stage as a first phase of an operation for separating the slimes from brine, it is customary to subject the material to a filtration step, or a countercurrent decantation process. In a countercurrent decantation process, water is passed countercurrent to the slimes through a succession of stages to recover most of the associated brine, and dissolve any solid sylvite, together with some halite and thus reduce the sylvite content in the final slimes discharge.

The C.C.D. process is oftentimes objectionable, since it requires considerable attention for efficient operation, considerable water input, large ground areas and brine storage tankage, as well as long "hold-up" of material being processed.

The present invention is based on the discovery that the countercurrent decantation procedure with its objectionable features can be eliminated, by providing a single stage treatment of the thickener underflow which effectively reduces brine and tailings losses. The single stage treatment of the underflow consists of the use of continuous solid bowl-type centrifuges operated at high gravities of about 1000 g. with addition to the charge under treatment of a suitable flocculant, with or without recirculation of the filtrate of such separation to the charge of the thickener.

Earlier attempts to centrifuge Carlsbad basin clays have required a long treatment time to centrifuge adequately and have led to very hard cakes which were difficult to remove. Earlier attempts to use centrifuges on such clays have been unsuccessful and the use of polyacrylamides at high gravities led to an unusual result. Application of the flocculants at high rate led to such rapid flocculation that the centrifugal separation became possible.

Accordingly, it is an object of my invention to provide a simple, economical and efficient process for reducing losses associated with separating tailings and/or slimes in a froth flotation treatment of sylvinite ore.

Another object of my invention is to provide a simple, economical and efficient method of treating slimes associated with sylvinite ore in a dewatering operation without substantial addition of water.

The practice of my invention will be described with reference to the accompanying flow sheet illustrating a typical circuiting arrangement for utilizing the invention. As shown in the flow sheet, ore, such as sylvinite ore from a bin 1 or other source of supply, is subjected to crushing or screening at stage 2 and then is subjected to scrubbing at stage 3 with brine addition as shown at 4, after which the scrubbed ore charge is subjected to a sliming treatment at stage 5. Ore slimes, inclusive of fine KCl, fine NaCl and brine are directed from stage 5 through a line 16 to a slimes thickener 6.

The ore pulp in desliming at stage 5, after slimes removal is conducted to a flotation stage 7, and more brine is introduced at stage 7 as shown at 8, with reagent introduced at 9. In some operations, it will be preferable to condition the deslimed ore pulp in a separate stage with brine and reagent to prepare a feed for the flotation separation which is performed in a following stage. Sylvite is concentrated at flotation stage 7 and the concentrate material is passed to a dewatering stage 10 from which dewatered sylvite solids are discharged as product, as shown at 11.

The brine separated from the sylvite product at stage 10 is a dirty liquor containing slimes contaminants and this brine is fed through a line 12 to the slimes thickener 6. The tailings from flotation stage 7 may be treated by alternate procedures. In one, they are passed directly to a tails dewatering stage 13 after which the dewatered tails are discharged to waste as shown at 14. The separated brine from stage 13 also is a dirty liquor which is delivered through a line 15 into slimes thickener 6.

In the alternate procedure, the flotation tailings are conducted to a heating stage 17 where sylvite solids of the tailings are dissolved. The tailings are passed from heating stage 17 to a dewatering stage 18 from which the dewatered tailings are passed to waste at 14. Dirty liquor from dewatering stage 18 is passed into line 15 and thence into slimes thickener 6, which has the usual sump or underflow discharge for settled solids or sludge and an overflow discharge for clarified brine. The underflow is conducted to a centrifuging stage, and preferably is directed through a feed splitter or other mechanism for distribution as feed to a plurality of continuous centrifuges 19.

In order to effectively separate the slimes solids from brine during centrifuging, I introduce a suitable polyacrylamide flocculant, such as "Separan," to each of the centrifuges 19. This flocculant may be introduced with branch feeds passing from the feed splitter into the centrifuges 19, but best results are obtained by a separate addition of the flocculant as shown at 20 into the interior of each centrifuge at a point where partial separation has already been obtained. The flocculant has an affinity for the insolubles, forming flocs which then move along with the other ore particles to the inside periphery of the rotating bowl and are continuously removed by mechanical means, while clarified brine passes from the separation as filtrate.

The solids discharge of centrifuges 19 is delivered onto a hopper or conveyor from which it passes through a line 21 as waste. The filtrate of each of the centrifuges 19 is discharged into a return or recycle line 22 which delivers it into thickener 6. The clarified brine overflow discharging from thickener 6 is delivered through a line 23 passing to a crystallizing stage 27, if hot, or to process if at normal temperature as shown at 29. By this procedure, the major portion of the sylvite dissolved in the brine, which in the usual operation comprises a large part of the tailings loss, is prevented from collecting with the waste solids.

The flow sheet illustrates another circuiting arrangement utilizing the present invention in which slimes from the crystallizing plant with or without addition of extremely fine sylvite concentrate comprises the material to be treated. As shown, some of the cencentrate from product 11 is fed to a dissolving stage 24 with heat introduced as shown at 25, and the resulting solution containing slime is fed to a thickener or clarifier 28 in which the slimes settle out and clarified overflow which is hot brine is delivered to a crystallizing stage 27.

As shown, crystallized material is discharged as product at 26 while the cold brine discharge of crystallizing stage 27 will be returned to dissolving stage 24 or may be returned to process. The underflow from thickener 28 is directed as feed to one or more centrifuges 31, with flocculant introduction at 32 in the manner previously described. Solids discharge of centrifuges 31 is passed to waste as shonw at 33 while separated effluent is conducted by a return or recycle line to thickener 28.

The aforesaid separation serves to retain as plant product a substantial amount of sylvite dissolved in brine that otherwise would be lost in the usual dewatering operations. In typical C.C.D. operations, the discard of 1 ton of clay slimes may cause the loss in contained brine of about 1 ton of potassium chloride, but generally is nearer 1.5 tons. In the centrifuging operations, on the other hand, the discard of 1 ton of clay slimes can be consistently held to less than 1 ton of potassium chloride per ton of slimes. Also, the treatment does not require input of water or brine in the final dewatering step as is required with countercurrent decantation and the circulating load of the dewatering operation is substantially less than in a countercurrent decantation treatment.

In preferred practice, the flocculant introduction to centrifuging is separate from the feed to centrifuging and preferably is discharged within the centrifuge at a point where the material under treatment has already attained a partial liquid-solids separation. Various flocculants used as clarification agents in the treatment of potash ores may be used. I have found that polycarylamide compositions sold under the trade name of "Separan" and "Benefite" are particularly effective for this purpose.

In a circuiting arrangement of the type shown in the flow sheet previously described, the operation is continuous and the brine discharge at 23 or 30 substantially balances the rate of brine input through lines 15 and 16 or from crystallizing stage 27 except for a small amount contained in the waste at 21 or 33.

My process also may be applied to the slimes produced by dissolution of the ore in solution recovery methods which are usually associated with the introduction of heat followed by cooling and recrystallization. The circuiting arrangements shown and described may be followed in such a treatment.

I claim:

1. In a process for recovery of the sylvite content of sylvinite ore, including desliming and thickening of the slimes material, the improvement which comprises passing said slimes containing thickener underflow to a continuous bowl-type centrifuge operated at a high gravity of about 1000 g., adding a polyacrylamide-type flocculant for the slimes insolubles to the charge in the continuous centrifuging stage so as to collect insoluble slimes with the solids discharge, thereby permitting discharge of most of the brine as the deslimed filtrate of said stage, and returning the deslimed filtrate to another stage of the process.

2. A process as defined in claim 1, in which the clean filtrate is passed as feed to a crystallization stage of the process.

3. A process as defined in claim 1, in which the underflow of the thickening stage is clarified in a single stage centrifuging treatment.

4. A process as defined in claim 1, in which the flocculant for insolubles is introduced into the continuous centrifuging stage at a point where partial separation has occurred so as to collect insoluble slimes with the solids discharge.

5. In a process for recovery of the sylvite content of sylvinite ore, including desliming the sylvinite ore, concentrating sylvite from the deslimed sylvinite ore by froth flotation, and dewatering the sylvite products of said froth flotation, the improvement which comprists subjecting the sylvite denuded flotation tailings to a further slimes separation treatment, including said flotation steps of delivering the tailings into a dewatering stage, discharging the dewatered tailings from the treatment, passing the separated slimes containing dirty liquor of the dewatering stage into a mechanical thickener stage, passing the thickener underflow to a continuous single stage bowl-type centrifuge operated at a high gravity of about 1000 g., adding a polyacrylamide-type flocculant for insolubles to the charge in the continuous centrifuging stage so as to collect insoluble slimes wth the solids discharge, thereby permitting discharge of most of the brine as the filtrate of said stage, and returning the filtrate to another stage of the process.

6. A process as defined in claim 5, in which the said flotation tailing are heated before delivery into the dewatering stage for dissolution of associated sylvite.

7. In a process for recovery of the sylvite content of sylvinite ore, including a sylvite crystallization stage, separation of crystallized sylvite from the liquor remaining after crystallization, and discharge of the crystallized sylvite product from the circuit, the improvement which comprises conducting the slimes-containing effluent liquor remaining after the sylvite crystallization to a mechanical thickener stage, passing the thickener underflow to a single stage continuous bowl-type centrifuge operated at a high gravity of about 1000 g., adding a polycrylamide-type flocculant for insolubles to the charge in said continuous centrifuging stage so as to collect insolubles with the solids discharge, thereby permitting discharge of most of the entering brine as the centrate of said stage, conducting clarified brine of the thickener stage through the crystallization stage, and returning the centrate through the thickener stage.

References Cited

UNITED STATES PATENTS

| | | | |
|---|---|---|---|
| 2,766,884 | 10/1956 | Marello | 23—312 X |
| 2,895,794 | 7/1959 | Darcy | 23—38 |
| 2,984,348 | 5/1961 | Adams | 209—12 |
| 3,008,655 | 11/1961 | Adams | 23—312 X |
| 3,037,624 | 6/1962 | Jackson | 209—12 X |
| 3,215,509 | 11/1965 | Adams | 209—12 X |
| 3,282,418 | 11/1966 | Abernathy | 209—12 |
| 3,308,946 | 3/1967 | Mitzmager | 209—172 X |
| 3,095,282 | 6/1963 | Wilson | 23—312 |

WILBUR L. BASCOMB, JR., *Primary Examiner.*

S. J. EMERY, *Assistant Examiner.*

U.S. Cl. X.R.

23—38, 300, 312; 209—5, 166; 210—44, 54